(12) United States Patent
Khoshnevisan

(10) Patent No.: US 7,890,528 B1
(45) Date of Patent: Feb. 15, 2011

(54) DYNAMIC REFINING OF SEARCH RESULTS AND CATEGORIES BASED ON RELEVANCY INFORMATION

(75) Inventor: Cyrus Khoshnevisan, Palo Alto, CA (US)

(73) Assignee: A9.Com, Inc., Palo Alto, CA (US)

( * ) Notice: Subject to any disclaimer, the term of this patent is extended or adjusted under 35 U.S.C. 154(b) by 0 days.

(21) Appl. No.: 12/716,992

(22) Filed: Mar. 3, 2010

Related U.S. Application Data

(63) Continuation of application No. 11/694,801, filed on Mar. 30, 2007, now Pat. No. 7,698,261.

(51) Int. Cl.
*G06F 17/00* (2006.01)
(52) U.S. Cl. .................. 707/769; 707/802; 715/700
(58) Field of Classification Search .......... 707/609, 707/705, 752, 769, 802, 999.001, 999.003, 707/999.007, 999.1, 999.2; 706/48; 715/700
See application file for complete search history.

(56) References Cited

U.S. PATENT DOCUMENTS

| | | | | |
|---|---|---|---|---|
| 7,003,503 B2 * | 2/2006 | Crosby et al. | ................. | 706/48 |
| 7,185,012 B1 * | 2/2007 | Koudas et al. | ..................... | 1/1 |
| 7,249,058 B2 * | 7/2007 | Kim et al. | .................... | 705/26 |
| 2002/0078045 A1 * | 6/2002 | Dutta | ............................ | 707/7 |
| 2003/0164844 A1 * | 9/2003 | Kravitz et al. | ............... | 345/700 |
| 2003/0220912 A1 * | 11/2003 | Fain et al. | ....................... | 707/3 |
| 2005/0138022 A1 * | 6/2005 | Bailey et al. | ................... | 707/3 |
| 2007/0011146 A1 * | 1/2007 | Holbrook | ....................... | 707/3 |
| 2008/0005118 A1 * | 1/2008 | Shakib et al. | ................ | 707/10 |

OTHER PUBLICATIONS

Moore et al, Statistical Threshold Design for the Two-State Signal-Dependent Rank Order Mean Filter, 2000, IEEE, pp. 904-907.*
Mukopadhya et al, An Algorithm for Automatic Web-Page Clustering using Link Structures, 2004, IEEE, pp. 472-477.*
Kuo et al, Ranking and Selecting Terms for Text Categorization via SVM Discriminate Boundary, 2005, IEEE, pp. 496-501.*

* cited by examiner

*Primary Examiner*—Fred I Ehichioya
(74) *Attorney, Agent, or Firm*—Kilpatrick Townsend and Stockton LLP

(57) ABSTRACT

A search can be refined to locate information about an item based on dynamically selected and ordered search categories. More specifically, methods and systems identify a set of search categories based on search category preference information obtained from the search results. The data entries are returned after searching on data stores with a search query provided by a user, and then the ranks of the returned data entries are determined based on a degree of relevancy with the search query. The dynamically selected search categories are displayed in an order corresponding to the rank of the data entries where the search category preference information is obtained.

21 Claims, 8 Drawing Sheets

DYNAMIC REFINING OF SEARCH RESULTS AND CATEGORIES BASED ON RELEVANCY INFORMATION

CROSS-REFERENCES TO RELATED APPLICATIONS

The present patent application is a continuation of, and claims priority to, U.S. patent application Ser. No. 11/694,801, entitled "Dynamic Selection and Ordering of Search Categories Based on Relevancy Information," filed Mar. 30, 2007. The entire content of this patent application is hereby incorporated herein by reference.

BACKGROUND

In a typical online merchandising environment, users can search for available items with several keywords related to the items. For example, a user may be able to search information about a specific item by providing a search engine with information such as a name of the item, a manufacture name of the item, and/or characteristics of the item. However, as the size of the online merchandising environment has increased, so has the number of available items and information related to the available items. One aspect of this growth is that a typical search result is simply too large for the user to browse.

Oftentimes, the search results can be sorted so that the user is presented with the potentially most relevant item for which the user is searching. In the event that the search results are too large, users can submit additional search criteria or alternative search criteria in order to reduce the size of the search results. To enable users to easily accomplish this, some search engines provide additional search tools that facilitate the display of pre-categorization. The pre-categorization is displayed along with the display of the search results and enables users to choose additional search criteria such as characteristics shared by numerous items or alternative search criteria of the search results.

Although the inclusion of pre-categorization can improve a general searching experience, users still can have difficulty utilizing the pre-categorization to locate a specific item since a set of search categories are predefined for display before any search is conducted. For example, even if the search results would rather be pre-categorized by colors in order to provide more meaningful categorization, the data entries in the search results may not be grouped by colors unless the color is one of the search categories predefined for display. Further, the order of the search categories within a display page is also predefined, and, thus, the search categories may not be dynamically reordered based on information obtained from the search results.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with an aspect of the present invention, a computer-implemented method is provided for dynamically displaying categorized information about items. The computer-implemented method includes obtaining data entries from the data store, determining ranks for the obtained data entries, and obtaining search category preference information from the ranked data entries. The data entries are obtained by querying a search request on the data store. Based on the obtained search category preference information, a set of search categories are identified and an order of the identified search categories is determined. Each identified search category will include an ordered set of category values which have been predefined for the identified search category. The search categories are displayed based on the determined order.

In accordance with another aspect of the present invention, a computer system is provided for displaying search categories based on preference information obtained from displayed data entries. The computer system comprises data stores and a computing device in communication with the data stores. The data stores store information relating to a set of search categories, category values for each search category, and information about available items. The computing device receives a search query to locate an item, obtains an initial search result including data entries from a search on the data stores and determines ranks for the data entries in the initial search result. Based on search category selection rules, the computing device identifies search category preference information from the ranked data entries. The computing device selects a set of search categories for display and then determines an order of the selected search categories based on the search category selection rules and the identified search category preference information. The set of search categories is displayed based on the determined order. In addition, each of the set of search categories includes corresponding category values. The corresponding category values are predefined for assisting a user to refine the initial search result.

In accordance with yet another aspect of the present invention, a computer-readable medium having computer-executable components for displaying search categories is provided. The computer-executable components include a data-store interface component for obtaining predefined search categories and data entries based on a search query and a user-interface component for displaying a set of search categories in the order which is determined based on preference information obtained from the data entries and for receiving a user selection from the displayed set of the search categories. The preference information is stored in a search category preference attribute field of a data entry.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Generally described, embodiments of the present invention relate to a method and system for refining a search to locate a data entry based on dynamically selected search categories. More specifically, a user is presented with dynamically selected and ordered search categories based on preference information obtained from ranked search results. The preference information may include search category preference information which is identified from the data entries in the search results. The search results are ranked based on relevancy, such as a degree of relevancy, relevancy score, etc. Based on the rank information, the selected search category will be ordered. For example, if the first ranked data entry has a "color" search category for its search category preference, the "color" search category will be displayed first among other search categories. In an aspect of the present invention, the search categories and the category values for the search categories are displayed based on the information obtained from the data entries so that the user can recognize a preferred search category and its category value most relevant to the item for which the user is looking.

Figure 1:
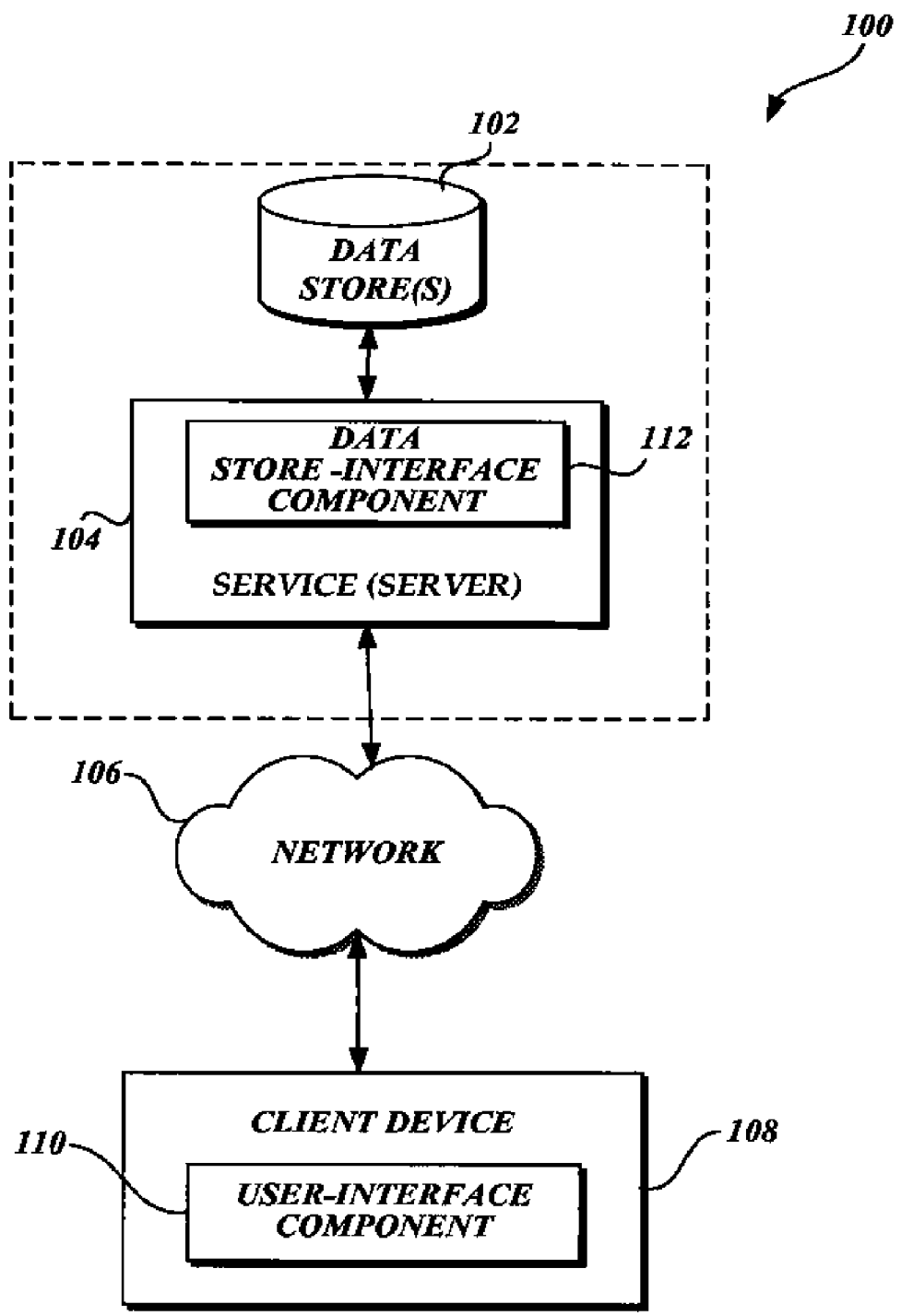
FIG. 1 is a block diagram of an illustrative operating environment including a number of data stores, a service server, and a client device in accordance with an aspect of the present invention.

With reference now to FIG. 1, an illustrative operating environment 100 can include a service server (service) 104 for searching data entries from one or more data stores 102 such as catalog, search index, etc., and a client device 108 to facilitate user interaction. The one or more data stores 102 can provide search results to a service 104 in response to a search query request which is in turn provided to the client device for display to a user. For example, if a user wants to find a data entry related to a pair of jeans, the user may input a few search keywords describing the pair of jeans for searching. In an illustrative embodiment, several data entries related to a pair of jeans are stored in a data store 102.

Each data entry can be stored and organized in any suitable way which allows each data entry to be searched or indexed based on common categories and/or attribute values. As will be discussed in greater detail below, a set of search categories and corresponding values may be predefined to group a search result for a particular item. For example, if "color" is predefined as a search category for the particular item and the "color" search category can have values, such as, "Yellow," "Black," "White," "Blue," etc., the search results (data entries) may be grouped based on their color attribute values.

Figure 6:
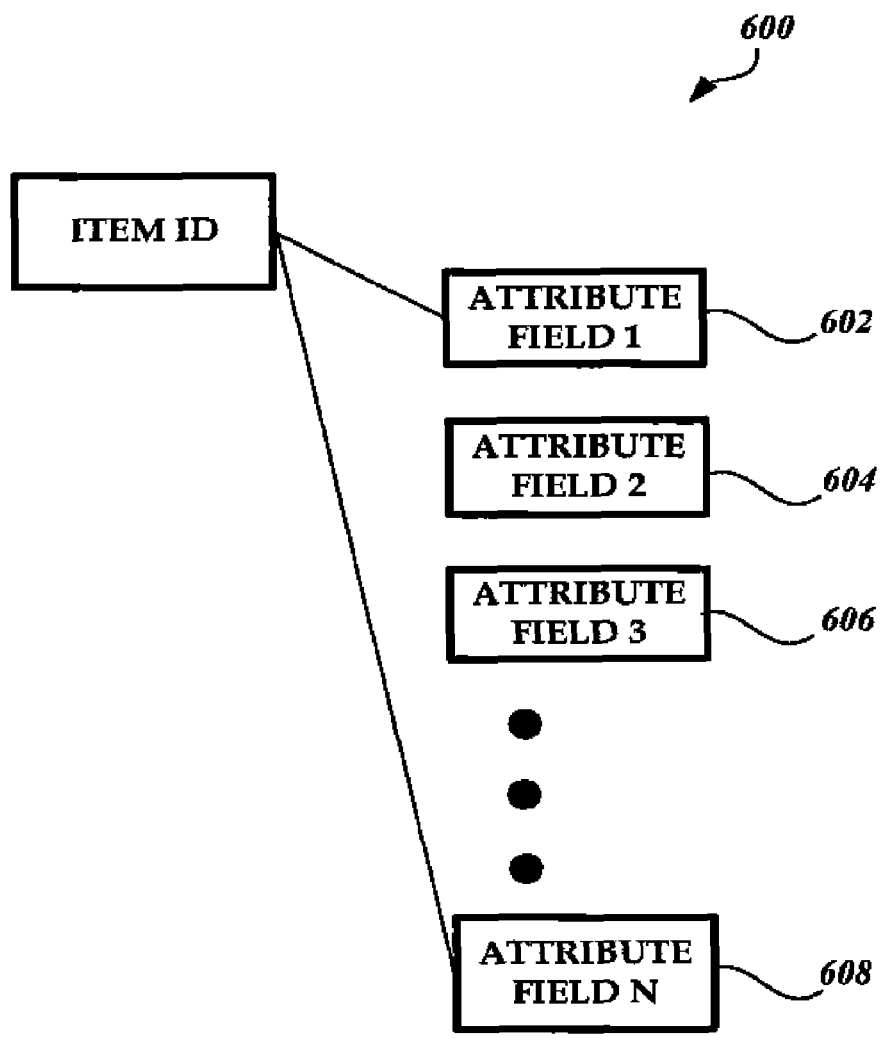
FIG. 6 is a block diagram of a data entry including several attribute fields in accordance with an aspect of the present invention.

As will be appreciated by one of ordinary skill in the art, each data entry in the data store may correspond to a structured set of attribute fields and corresponding values. Referring to FIG. 6, a block diagram 600 depicts a data entry corresponding to a set of attribute fields 602-608 in accordance with an aspect of the present invention. The set of structured attribute fields will be used to store information particular to an item corresponding to the data entry. For example, if an item is related to women's active wear, several attribute fields are defined to have attribute values related to an item identifier, such as product category, style, size, price, manufacturer, color, seller, type, promotion, etc. Further, the attribute fields can be defined for a group of data entries so that the data entries can be searched or indexed based on a common category and/or attribute values.

Several search categories and corresponding category values may be predefined to categorize a search result. For example, for the jean product items, several search categories, such as "gender," "style," "color," "size," "brand," "merchant," etc., would have been predefined. A set of category values are also defined for each search category. Thus, if "color" is identified as a search category based on the search result and the "color" search category includes a set of category values such as, "Yellow," "Black," "White," "Blue," etc, the search results (data entries) can be grouped based on its color attribute value. In an aspect of the present invention, the data entries may be ranked by the service 104 based on a ranking policy or ranking rules. For example, the data entries may be ranked based on a degree of relevancy between the data entry and the search query.

A set of search categories are selected from the predefined search categories based on preference information identified from the data entries. More specifically, preferred search category information stored in the data entries may be identified. With that information, a set of search categories is selected and the order in which to display the selected search categories may be determined. For example, if the first ranked data entry has "price" for its "search category selection preference" attribute value, a search category related to "price" is selected from the predefined search categories and will be displayed first among other selected search categories. Further, the order of category values in a search category is arranged to reflect the ranking information of the data entries so that users can effectively narrow the search by selecting a category value most relevant to the search query. For example, if the first ranked data entry has "$50" for its price attribute value, "$0-50" is displayed first among other category values of the price search category.

In an illustrative embodiment, a data-store interface component 112 can obtain data entries from one or more data stores 102. The data-store interface component 112 can obtain data entries from one or more local data stores 102 or from one or more remote data stores 102 over a network 106. A user-interface component 110 can obtain the search results (data entries) from the data-store interface component 112 for display to a user. In an illustrative embodiment, the user-interface component 110 represents the front-end of a stand-alone application, such as a Web browser. Alternatively, the user-interface component 110 can be integrated with one or more software applications. For example, the user-interface component 110 could be integrated into a customized purchasing system such that potential purchasers are able to view and manipulate the search result before making a purchase.

One skilled in the relevant art will appreciate that the data and/or components may be stored on a computer-readable medium and loaded into memory of the client device 108 using a drive mechanism associated with the computer-readable medium, such as a floppy, CD-ROM, DVD-ROM drive, or network interface. Further, the components can be included on a single device or distributed in any manner. For example, all the components could be located on the client device 108. Furthermore, the components can be integrated in any manner. For example, the user-interface component 110 and data-store interface component 112 could be integrated into a single component. Furthermore, the components shown in FIG. 1 represent an illustrative embodiment. In other embodiments, components can be removed or their functionality can be provided by another component. For example, the service component 104 and data-store interface component 112 may be removed or their functionality could be provided by another component.

Figure 2A:
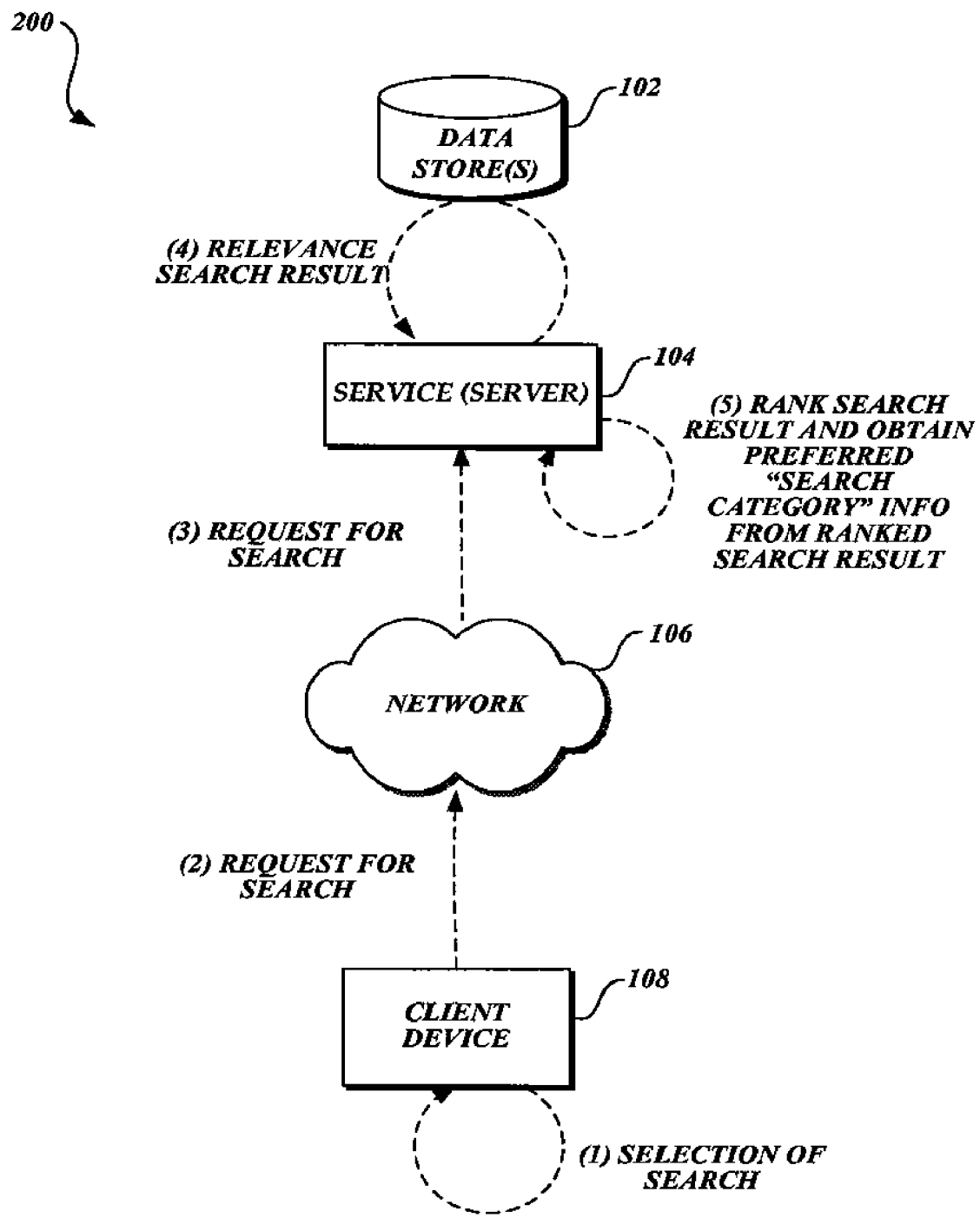
FIGS. 2A-2B are block diagrams of the operating environment of FIG. 1 illustrating interactions among various components in the operating environment where a client device submits a search query to the service which returns the reordered search categories based on preference information obtained from data entries in accordance with an aspect of the present invention.
Figure 2B:
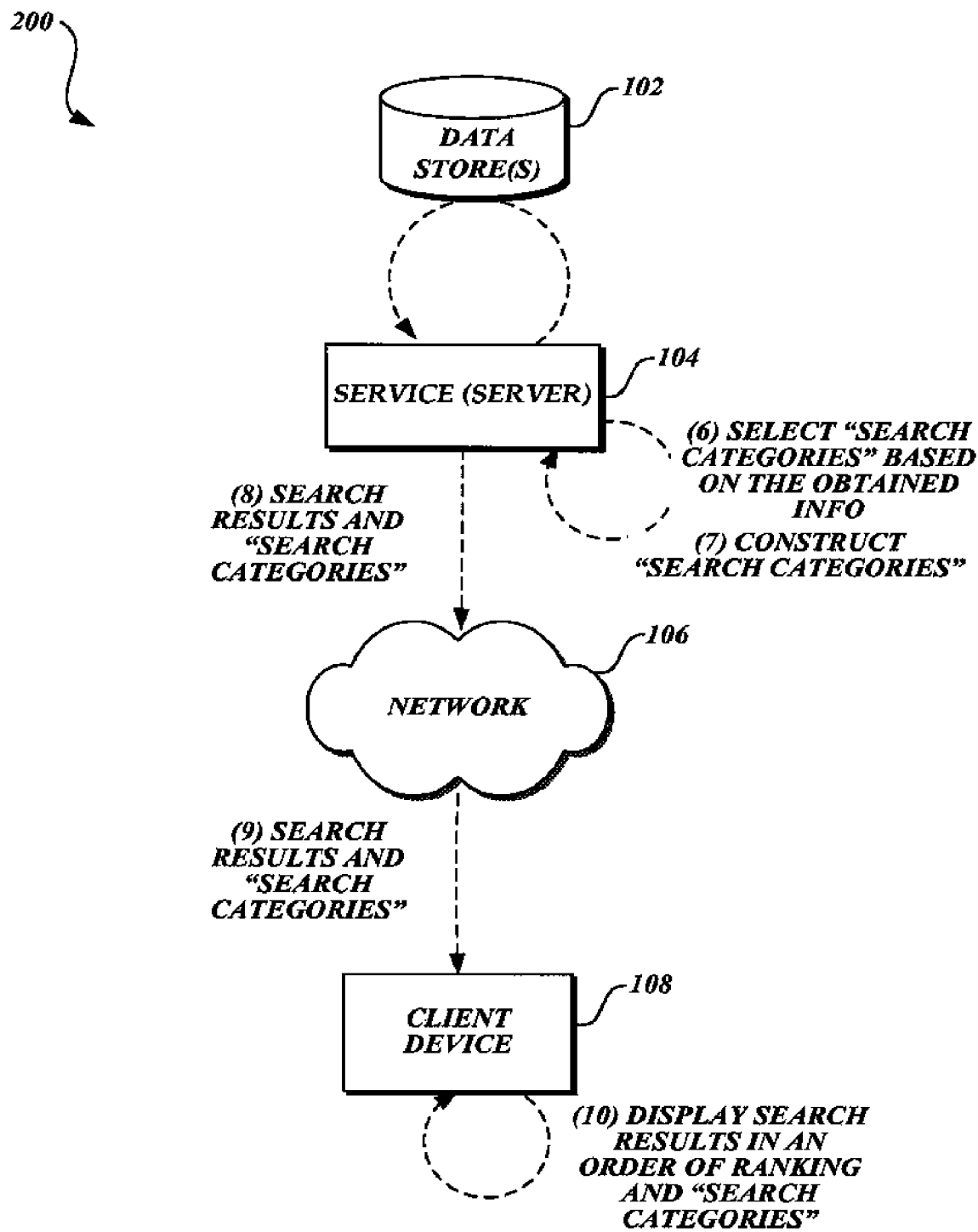

With reference now to FIGS. 2A-2B, the interaction by various components of the operating environment 100 to dynamically display the search categories corresponding to the identified search category preference information will be described. As illustrated in FIG. 2A, a user may make a selection for a search request of an initial search. For example, an initial search can be selected by clicking a hyperlink representing categories within a Web page. For another example, an initial search can be selected by choosing a search menu choice provided within a Web page. Alternatively, a user may input a search query including several keywords. A client device 108 may issue a request for the initial search. The request for the initial search can be transmitted via a communications network 106, such as the Internet. A service 104 obtains the request and issues a query to the data store 102 for initial search with the search query, such as keywords, categories, etc. For example, if the user selects a "denim" product category for a search request, the client device transmits a search request for locating items in the "denim" product category. Then, the service 104 would issue a query request to the data store 102 for data entries related to the "denim" product category. In response to the query request, the data store 102 provides the initial search results to the service 104.

In an illustrative embodiment, the service 104 may rank the initial search results based on the ranking policies and rules, such as a relevancy algorithm that associates a relevancy score to the data entries in the search index and/or catalog. For example, relevancy information may be used to rank the initial search results. For the top ranked data entries, the service 104 may identify search selection preference information. For example, assume that a data entry has an attribute field for storing preference information specifying a preferred search category for the data entry. In that example, for the top ranked data entries, the service 104 identifies the corresponding attribute value which is specific to a search category. Based on the identified attribute values, a set of search categories for the search results and the display order thereof may be determined. Further, a set of category values for the determined search categories may be obtained from the data store 120. Then, the service 104 generates an ordered set of category values for each determined search category based on the ranks of data entries.

To ease the discussion, the examples and embodiments described herein use the ranks determined based on relevancy information such as a degree of relevancy. However, it is to be understood that the initial search result can be ranked through any suitable ranking methods.

As illustrated in FIG. 2B, once the service 104 constructs a set of search categories with the ordered set of category values based on the ranked initial search results, the constructed search categories, the ranked initial search results, and the corresponding page data can be transmitted to a client device 108. The constructed search categories, the ranked initial search results, and the corresponding page data can be transmitted via a communications network 106. After the client device 108 obtains the constructed search categories, the ranked initial search results, and the corresponding page data, the client device 108 can display the results for the search request along with the constructed search categories to a user. For example, the page data can be used to construct a user interface, such as a Web page, which can be used to present the initial search results in order of ranks for data entries and the search categories with the ordered sets of category values. As will be discussed in greater detail below, the constructed search categories may be presented to users in accordance with search category preference information indicated in the top ranked data entries. The value of the search categories determined are based on the attribute values of the currently displayed data entries and further are ordered based on the ranking information of the currently displayed data entries in the Web page. For example, assume that the Web page is constructed to present the first five data entries from the ranked initial search results along with the search categories with the order sets of category values. In this example, the search categories are identified based on search category preference information from the first five data entries and ordered based on the ranks for the first five data entries. The ordered set of category values are generated based on the attribute values of the first five data entries and the ranking information of the first five data entries displayed in the Web page.

A user can make a selection from an ordered set of category values for a particular search category. For example, a category value could be selected by clicking one of the graphic components displayed on the Web page, such as hyperlinks, check boxes, icons, etc. associated with the ordered set of category values of search categories. After the user makes a selection, the client device 108 issues a request for a second search (generally to narrow the initial search results). The request for the second search can be transmitted via a communications network 106, such as the Internet. A service 104 obtains the request and issues a query to the data store 102 for narrowing the initial search result. For example, the user may have selected a "small" for a "size" search category to narrow the search result with a "woman, jean, pants" search query. The service 104 would issue a request to the data store 102 for a subset of data entries which have the attribute value of "small" for the "size" attribute field.

In response to the query, the data store 102 provides the service 104 a subset of the initial search results narrowed by the selected category value. Further, in one embodiment, the service 104 has pre-categorized the initial search results based on the category values of the search categories which have been identified based on search category preference information obtained from the initial search results. The initial search results are grouped based on the pre-categorization. In this manner, when the user selects a category value(s) from displayed search categories to narrow the initial search result, the service 104 may not have to run an unnecessary search on the data store 102. Alternatively, the data store 102 provides a new search result which may not be the subset of the initial search results.

Once the service 104 obtains from the data store 102 a subset of the initial search results grouped by the selected category value, the service 104 may select a set of new search categories in accordance with the search category preference information identified from the data entries in the obtained subset. The service 104 may also generate new ordered sets of category values for the selected search categories based on ranking information of data entries in the obtained subset. The subset of the initial search result, the search categories with the new ordered sets of category values, and corresponding page data can be transmitted to a client device 108. The subset, search categories with the new ordered sets of category values, and corresponding page data can be transmitted via a communications network 106. The client device 108 obtains the corresponding attributes, the search categories with the new ordered sets of category values, and page data and can display the results to a user. For example, the page data can be used to construct a user interface, such as a Web page, which can be used to present the initial results in order of ranks and the search categories with the ordered sets of category values. The ordered sets of category values may be presented to users in such a way that the ordered sets of category values show the correlation with ranking information of data entries displayed in a Web page. For example, the ordered sets of category values displayed in the Web page correspond to rank information of the displayed data entries in the Web page.

Figure 3:
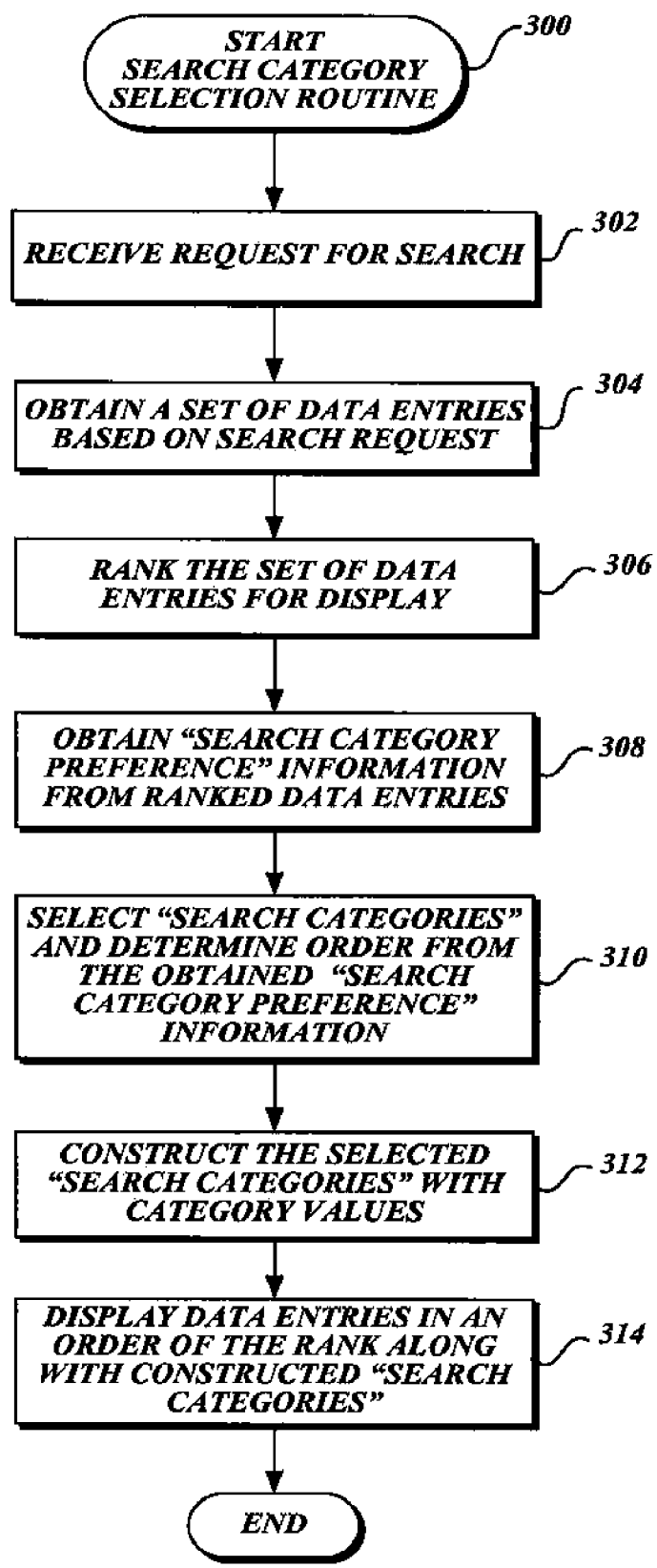
FIG. 3 is a flow diagram illustrating a search category selection routine in accordance with an aspect of the present invention.

With reference now to FIG. 3, a flow diagram illustrative of a search category selection routine will be described. At block 302, a request for search may be received from a user. As explained above, a user can input a search query or select a search query by clicking a hyperlink on a Web page. For example, referring to FIG. 4, a user can input "denims, women, pants" in a search query box 408 in the Web page 400. At block 304, data entries resulting from a search based on the search request are obtained. For example, the client device 108 can transmit a request for search with the search query inputted by the user to a service 104. The service 104 conducts a search with the search query on the data store and obtains data entries as a result. Continuing with the example above, if the user has inputted "denims, women, pants" in a search query box 408, then data entries that have attribute values relevant to the "denims, women, pants" may be obtained. At block 306, the search results (data entries) are ranked based on a set of ranking rules and policies. For example, a set of ranking rules may specify that the searched data entries are to be prioritized based on a degree of relevance between a data entry and the search query and may specify how to measure the degree of relevance.

At block 308, the service obtains search categories preference information from the ranked data entries. Referring to FIG. 6, a block diagram 600 depicts data entry including several attribute fields that are used to store information particular to an item. For example, a data entry may include a "search category preference" attribute field to store one or more attribute values related to preferred search categories. Returning back to FIG. 3, at block 310, the order of the selected search categories may be determined based on the search category preference information obtained from the data entries. In one embodiment, a set of search categories are selected based on the search category preference information, for example "search category selection" attribute values, identified from the top ranked data entries. In this embodiment, the order of the selected search categories for display is determined based on the ranking information of the top ranked data entries. Alternatively, "search category preference" attribute values may be ordered based on the cardinal number.

Figure 4:
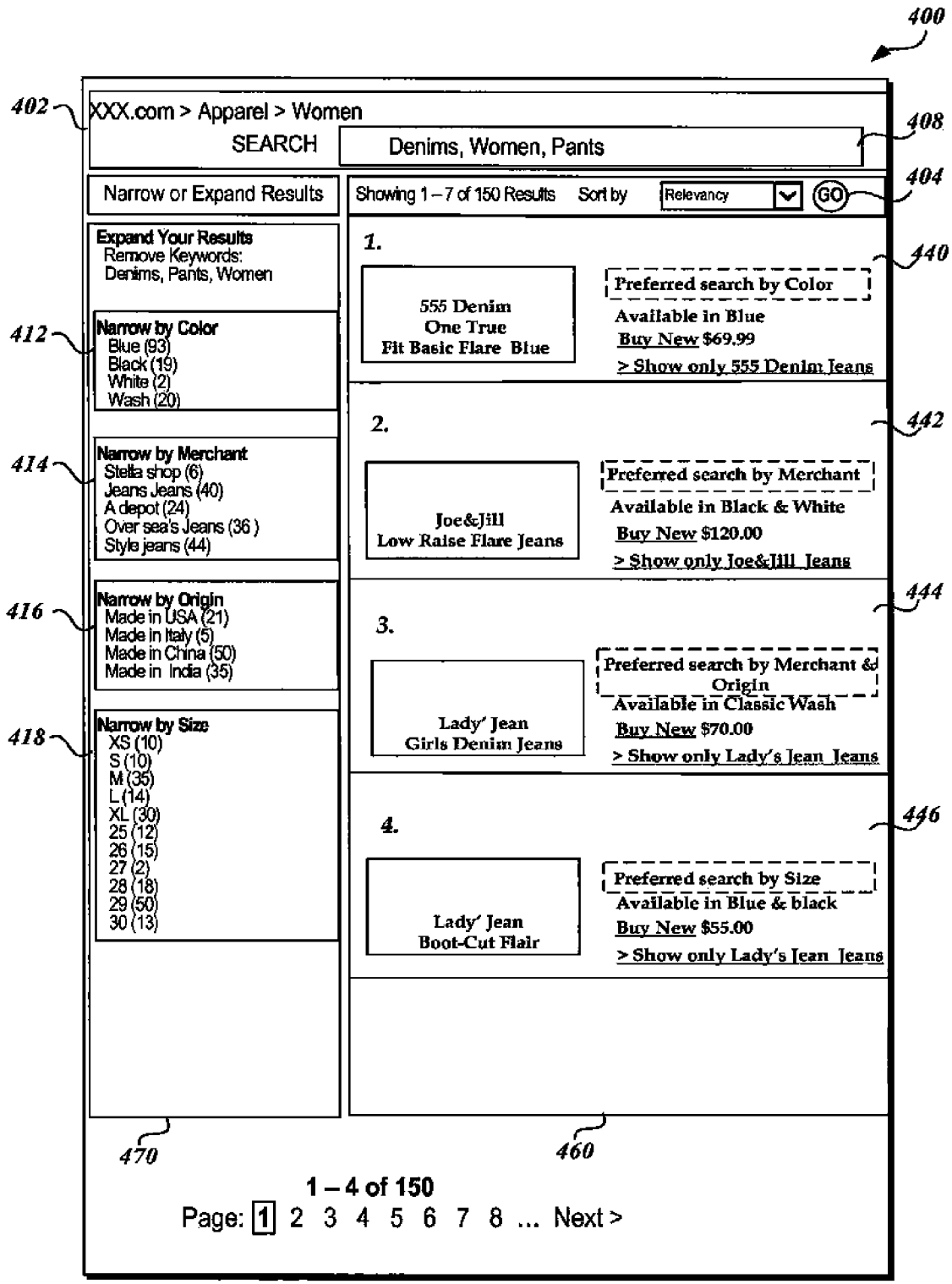
FIG. 4 is an exemplary screen display illustrating the search results for an item and the search categories selected based on preference information obtained from the search result in accordance with an aspect of the present invention.

Continuing with the example above, the service 104 selects a search category related to "color," if the service 104 identifies "color" from the "search category preference" attribute field of the first ranked data entry 440. Likewise, the service 104 selects a search category related to "merchant" if the service 104 identifies "merchant" from the "search category preference" attribute field of the second ranked data entry 442. The service 104 also determines the display order of the selected search categories in accordance with the ranks of the respective data entries. For example, the "color" search category will be displayed first followed by the "merchant" search category in the Web page as depicted in FIG. 4.

Alternatively, the service 104 considers the number of data entries which have the similar or same "search category preference" attribute values when selecting the search categories. More specifically, a "search category preference" attribute value of each data entry in the search results is identified. The cardinal number of each "search category preference" attribute value may be determined. For example, for each identified "search category preference" attribute value, the number of data entries that have the "search category preference" attribute value may be determined. Based on the number of the data entries, a set of search categories and the order of the search categories for display may be determined. Generally, the number of the search categories that can be displayed to users may be limited. Thus, the service 104 may select a predetermined number of search categories for display. For example, if the predetermined number of search categories for display is three, three search categories are selected based on the three most common "search category preference" attribute values.

As will be appreciated by one of ordinary skill in the art, the above-mentioned embodiments are described merely for exemplary purposes. It is to be understood that the selection of the search categories or the order of the search categories for display can be dynamically determined in numerous ways through an analysis of the search results.

At block 312, the selected search categories are constructed with a corresponding category value. As mentioned above, the category values of the selected search categories may be ordered in accordance with the ranking information (e.g., ranks in the search results) of the data entries. At block 314, the service 104 displays the data entries in order of the ranks in the search results. Further, in conjunction with the data entries, the service 104 also displays the selected search categories in the order which is determined based on the search category preference information. Continuing with the example above, the selected search categories, such as "Color," "Merchant," "Origin," "Size," and "Price" are displayed based on the determined order to assist a user to narrow the initial search result, as depicted in FIG. 4.

Moreover, the category values of search categories are displayed in an order corresponding to the ranks of the ranked data entries. In one embodiment, the service 104 may generate the ordered set of category values of each search category based on the ranking information of the initial search result. In this example, the service 104 takes the first ranked data entry and identifies attribute values corresponding to category values for the search categories. Then, the service 104 takes the second ranked data entry and identifies attribute values of the data entry which correspond to category values for the search categories. The service 104 may repeat this for each data entry of the first set of data entries. The number of the first set of data entries may be specified in the set of rules and policies. Typically, the number of the first set of data entries may be limited by the layout of a display screen. The service 104 may generate an ordered set of category values based on the identified attribute values of the first set of data entries.

With reference now to FIG. 4, an exemplary display screen 400 presenting the search results and receiving user manipulations on the displayed search results is depicted. The exemplary display screen 400 can include a browse menu 402 to enable a user to start a search to locate a specific item. For example, the browse menu 402 can include a search query box 408 where a user can input a search query (e.g., several search keywords), such as "denims, women, pants." The user may select a search initiation button, for example, "go" button 404, to submit the search query.

The inputted search query is transmitted to the service 104 which will return to the client device the ranked initial search results. As mentioned above, upon receipt of a search request from the client device, the service 104 may issue a search query on the data store based on the search query included in the search request. In some instances, the search query may be processed to determine some meaningful keywords, relevancies among the keywords, etc. Further, other relevant information may be collected to enhance the search. For example, user profile information including user preference, previous search history, etc., may be considered to determine a degree of relevancy. Subsequently, the data store will provide the initial search results based on the search query. As will be appreciated by one of ordinary skill in the art, in addition to the search query box, the browse menu 402 may include a browser tree or a menu choice (not shown) consisting of product categories and subcategories where a user can select one for a search keyword.

Upon receipt of the initial search results from the data store, the service 104 may sort or prioritize the data entries in the initial search results based on the ranking information of the data entries. The ranking information may be temporarily stored along with the data entries. A set of search categories are selected based on the preference information obtained from the data entries for constructing the exemplary display screen. Further, the set of search categories may be ordered in accordance with the search category selection rules. For example, the search category selection rules can specify that the set of search categories are to be ordered based on ranking information of the data entries. Alternatively the search category selection rules can specify that the set of search categories are to be ordered based on the number of data entries which have the same search category preference, or that the set of search categories are to be ordered based on the cardinal number of each "search category preference" attribute value. In this embodiment, the preferred search categories for each data entry may be identified. The data entries having the same search category preference may be grouped together and the number of the data entries grouped together may be determined.

For the purpose of discussion, assume that the examples and the embodiments described herein for FIG. 4 are governed by the search category selection rules specifying that the set of search categories will be ordered based on ranking information of the data entries.

In an illustrative embodiment, the constructed page may display information in two separate sections: a ranked search results section 460 and a search category section 470. The ranked search results section 460 generally displays the initial search results in an order of the ranking information for data entries. The search category section 470 displays the selected search categories and corresponding category values.

If the initial search result is large, a first set of the ranked data entries will be displayed in a first Web page. As shown, a first set of the data entries 440-446 (e.g., top four data entries) will be displayed in the first Web page 400. The rest of the data entries will be displayed in the next Web pages based on the ranking information. The determined search categories 412-418 will be displayed in the search category section along with the ranked search result section displaying the first set of data entries 440-446. The order of the search categories may be determined based on the ranking information of the first set of data entries 440-446. For example, the service 104 identifies "Color" search category 412 from the first ranked data entry 440, "Merchant" search category 414 from the second ranked data entry 442, "Origin" search category 416 from the third ranked data entry 444, and "Size" search category 418 from the forth ranked data entry 442. The "Color" search category 412, "Merchant" search category 414, "Origin" search category 416, and "Size" search category 418 are displayed in accordance with the ranks of the data entries 440-446 as illustrated in FIG. 4.

Each search category can further include a set of category values that allow a user to narrow his or her search. The set of category values are displayed in an order corresponding to the ranks of the first set of data entries 440-446. For example, the "Color" search category for the jean product may have a set of category values such as "Blue," "Black," "White," and "Wash." Since the first ranked data entry 440 has the attribute value of "Blue" for the "Color" attribute field, "Blue" is displayed first in the set of category values for the "Color" search category. The second ranked data entry 442 has the attribute values of "Black" and "White" for the "Color" attribute field and thus "Black" is displayed second in the set of category values for the "Color" search category 440-446.

By clicking on one of the category values from a displayed search category, a user can narrow his or her search to a subset of the initial search results. This allows the user to quickly locate the specific item he or she is looking for since the order of search categories is dynamically determined based on the displayed data entries. Thus, when a user finds the first displayed item is relevant to the specific item the user is looking for, the user can find the preferred search category of the first displayed item which may lead the user to locate the specific item.

As shown, the exemplary display 400 can include illustrations that correspond to the search categories which are dynamically identified based on the search results. As shown, for the "women's denim pants" search, "Color," "Merchant," "Origin," and "Size" search categories are identified and ordered based on the preference information obtained from the first set of the ranked data entries 440-446.

Figure 5A:
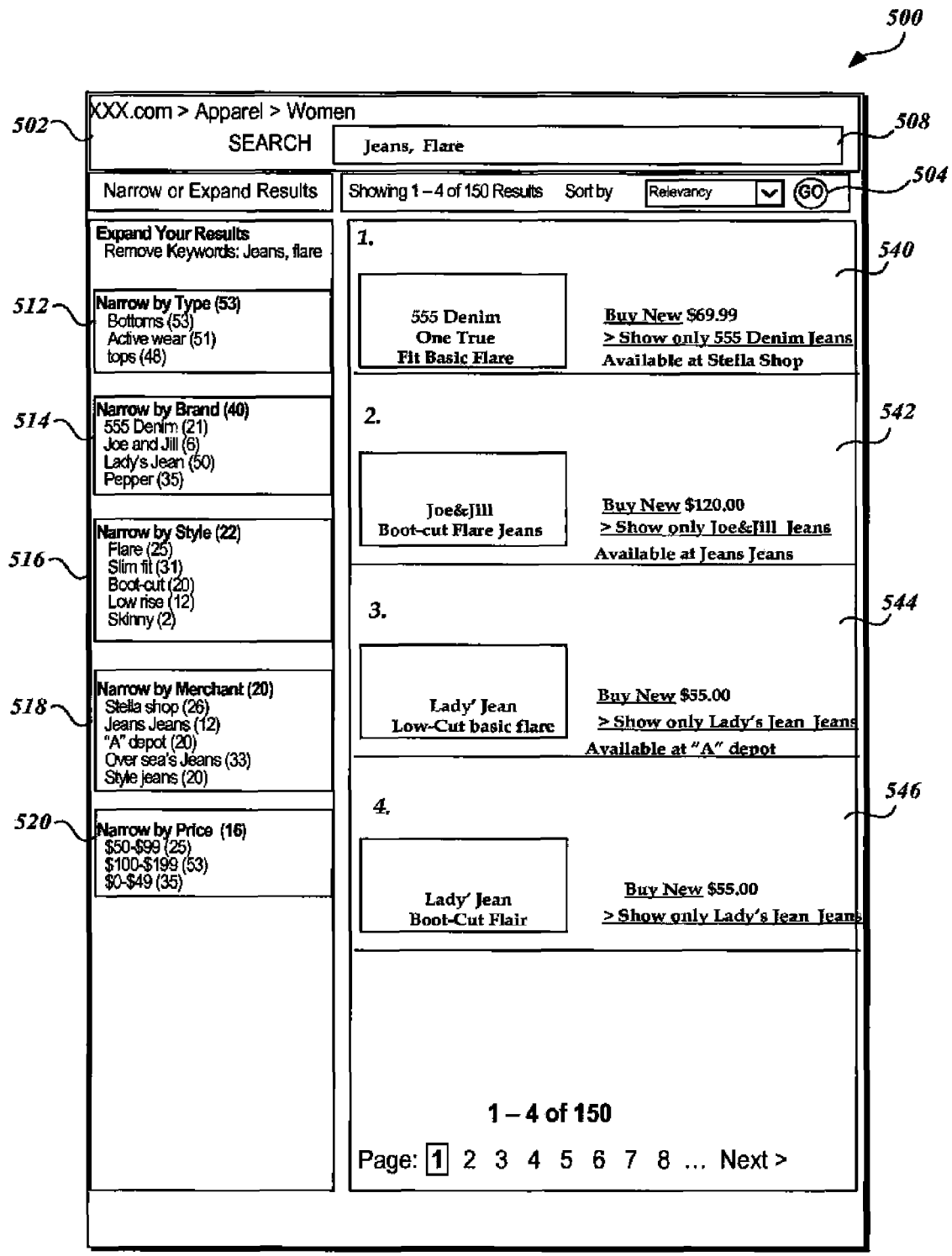
FIG. 5A is another exemplary screen display illustrating the search results for an item and the search categories selected based on preference information obtained from the search result in accordance with an aspect of the present invention.

With reference now to FIG. 5A, another exemplary display screen 500 presenting the search results and receiving user manipulations on the displayed search results is depicted. As with FIG. 4, the exemplary display screen 500 can include a browse menu 502 to enable a user to start a search to locate an item. For example, the browse menu 502 can include a search query box 508 where a user can input a search query, such as "Jeans, flare, black." The inputted search query is transmitted to the service 104, which will return to the client device the ranked initial search results. Upon receipt of the initial search from the data store, the service 104 may sort or prioritize the data entries in the initial search results based on some defined policy. A set of search categories are identified based on the initial search results for the exemplary display screen.

Figure 5B:
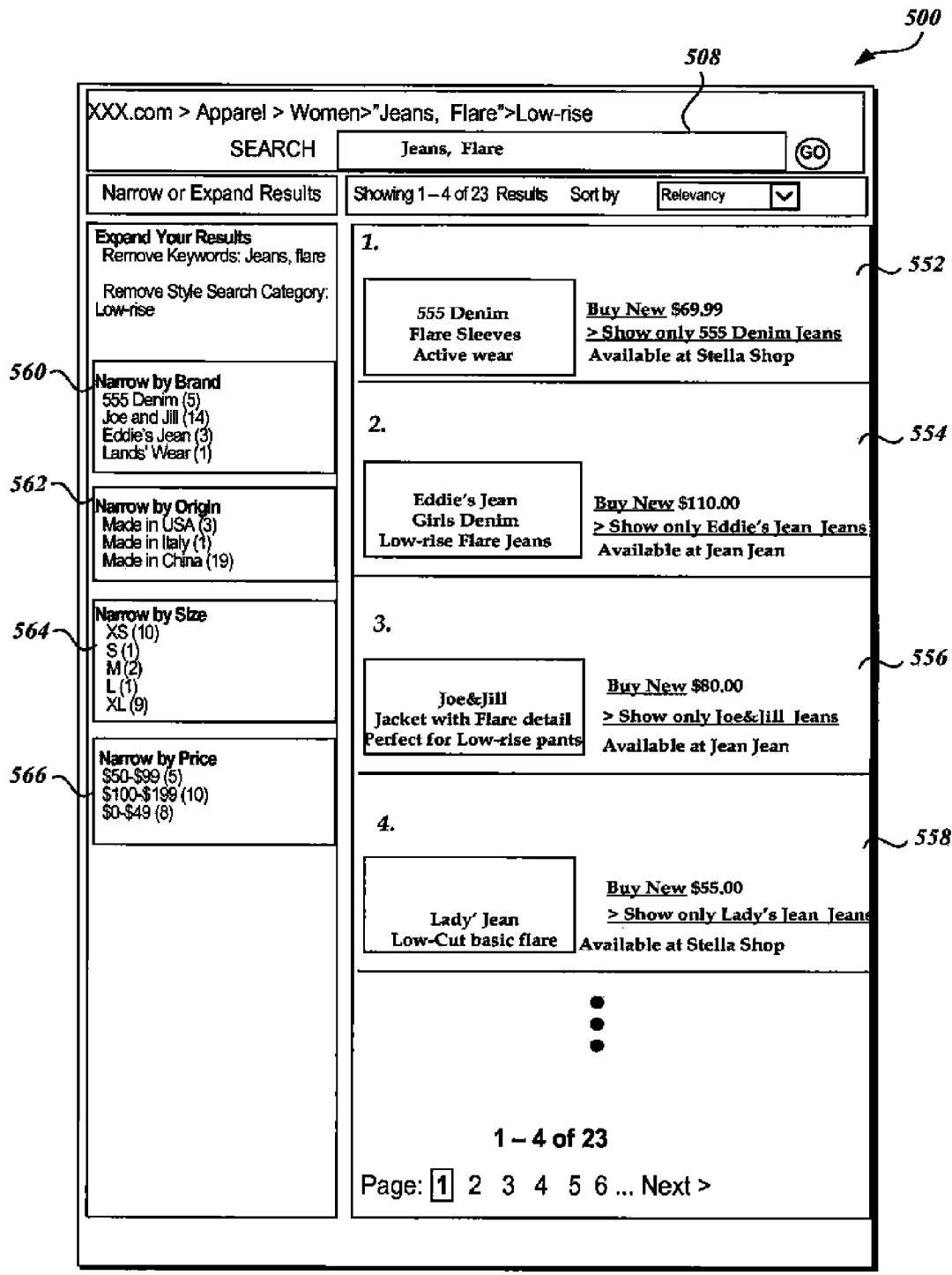
FIG. 5B is the exemplary screen display of FIG. 5A illustrating the search results and the search categories after a user selects a category value from one of the displayed search categories in accordance with an aspect of the present invention.

For the purpose of discussion, assume that the examples and the embodiments described herein for FIGS. 5A and 5B are governed by the search category selection rules specifying that the search categories are to be determined and ordered based on the number of data entries having the same search category preference.

As shown, 150 data entries are returned from the data store in response to the search query. The service 104 selects the search categories 512-520 based on the search category preference information, for example "search category preference" attribute values, identified from the 150 data entries. The data entries having a search category preference attribute value corresponding to a particular search category may be grouped and the number of the data entries grouped together may be determined. For example, a "Type" search category is identified and displayed first if the corresponding data entry group has the largest number of data entries. Likewise, a "Brand" search category is also identified and displayed following the "Type" search category if the corresponding data entry group has the second largest number of data entries. The service 104 repeats this until a predetermined number of search categories, for example the search categories 512-520, are selected and ordered based on the number of data entries grouped together.

As shown, the exemplary display 500 can include illustrations that correspond to the selected search categories 512-520 along with the first set of data entries 540-546 so that a user can quickly make a decision to narrow the search. For example, the "Type" category 512 is displayed including an ordered set of category values such as "Bottoms," "Active wear," and "Tops" in conjunction with the number of data entries having corresponding attribute values. Likewise, the "Brand" search category 514 is displayed including an ordered set of category values such as "555 Denim," "Joe and Jill," "Lady's Jean," "Eddies' Jean," and more. Further, the "Style" search category 516 is displayed including an ordered set of category values such as "Flare," "Slim Fit," "Boot-cut," "Low-rise," "Skinny," etc. The "Merchant" search category 518 is displayed including an ordered set of category values such as "Stella shop," "Jeans Jeans," "'A' depot," "Over sea's Jeans," etc. The "Price" search category 520 is displayed including an ordered set of category values such as "$50-$99," "$100-$199," "$0-$49," etc.

Through manipulations on the exemplary displayed screen, a user can make a selection of a category value from the displayed search categories. For example, a category value could be selected by clicking one of graphic components displayed on the Web page, such as hyperlinks, check boxes, icons, etc., associated with the ordered set of category values of search categories. After the user makes the selection, the client device 108 issues a request for a second search (generally to narrow the initial search results). The request for the second search can be transmitted via a communications network 106, such as the Internet.

With reference now to FIG. 5B, the exemplary display screen 500 presenting a subset of the initial search result after receiving user selection on the category values of the search categories is depicted.

Upon receipt of the user selection, the service 104 will obtain a subset of the initial search corresponding to the user selection. For the purpose of discussion, assume that the initial search result can be grouped into several subsets of data entries based on the category values of the search categories. For example, for the "Style" category, there are five subsets of the initial search result corresponding to each category value such as "Slim fit," "Flare," "Low-rise," "Skinny," and "Boot-cut." In one embodiment, the service 104 may conduct a new search with the search query and the selected category value on the data store.

When the user selects "Low-rise" to narrow the search, the client device transmits the user selection to the service 104. Subsequently the service 104 obtains a subset of data entries (hereinafter, second search results) having an attribute value of "Low-rise." As discussed above, the service 104 may re-rank the second search results based on the ranking policies and rules or the rank information determined for the initial search results. A new set of search categories will be determined for the second search results.

As shown, the second search results, which are narrowed by "Low-rise," are displayed. As shown in FIG. 5B, a new set of search categories 560-566 are displayed along with the second search results 552-558 and each search category can further include an ordered set of category values that allow a user to narrow his or her search.

For example, the new set of search categories 560-566 are displayed in accordance with the preference information obtained from the data entries in the second search results. As will be appreciated by one of ordinary skill in the art, the displayed search categories for the second search results can differ from the displayed search categories for the initial search results. For the second search results, a new set of search categories, such as "Brand" search category, "Origin" search category, "Size" search category, and "Price" search category, are identified and ordered for display. As shown, the exemplary display 500 can include illustrations that correspond to the newly selected search categories 560-566 along with the data entries 552-558 so that a user can quickly make a decision to narrow the search. For example, the "Brand" search category 560 is displayed including an ordered set of category values such as "555 Denim," "Joe and Jill," "Eddies' Jean," "Lady's Jean," "Pepper," etc. Likewise, the "Origin" search category 562 is displayed including an ordered set of category values such as "Made in USA," "Made in Italy," and "Made in China." Further, the "Size" search category 564 is displayed including an ordered set of category values such as "XS," "S," "M," "L," "XL," etc. The "Price" search category 566 is displayed including an ordered set of category values such as "$50-$99," "$100-$199," and "$0-$49."

As will be appreciated by one of ordinary skill in the art, the order or selection of search categories can be overwritten by a human administrator or a qualified user. For example, if there is a need to have a particular search category to be first displayed among other search categories regardless of the preference information obtained from data entries, the service may allow a human administrator to change the order or selection of the search categories.

While illustrative embodiments have been illustrated and described, it will be appreciated that various changes can be made therein without departing from the spirit and scope of the invention.

What is claimed is:

1. A computer-implemented method for refining search results using dynamically displayed categorization information, comprising:
   under control of one or more computer systems configured with executable instructions,
   in response to receiving a search query, providing for display a first ordered set of data entries and at least one of a first ordered set of preferred search categories, the first ordered set of data entries selected from a data store based at least in part on the received search query, the first ordered set of preferred search categories selected based at least in part upon search category preference information for at least a portion of the data entries in the first ordered set of data entries, the search category preference information for each data entry in the first ordered set of data entries specifying at least one search category as a preferred search category for the data entry;
   receiving a selection of a displayed preferred search category; and
   in response to the received selection, providing for display a second ordered set of data entries and a second ordered set of preferred search categories, the second ordered set of data entries selected from the data store based at least in part on the received search query and the selected preferred search category,
   wherein the second ordered set of data entries is able to include at least one data entry not included in the first ordered set of data entries, and
   wherein selecting the first ordered set of preferred search categories includes selecting a pre-defined number of search categories based at least in part upon the corresponding search category preference information.

2. The computer-implemented method of claim 1, wherein the second ordered set of preferred search categories includes at least one preferred search category not included in the first ordered set of preferred search categories.

3. The computer-implemented method of claim 1, wherein each preferred search category further includes a set of category values.

4. The computer-implemented method of claim 3, wherein at least a portion of the set of category values for each displayed preferred search category is provided for display and ranked based at least in part upon search category preference information for at least a portion of the data entries in the corresponding ordered set of data entries.

5. The computer-implemented method of claim 1, further comprising:
applying search category selection rules to identify and order the preferred search categories.

6. The computer-implemented method of claim 5, wherein the identifying and ordering of the preferred search categories according to the search category selection rules is based at least in part upon a total number of the data entries sharing corresponding search category preference information.

7. The computer-implemented method of claim 1, wherein the pre-defined number is a maximum number of search categories that will be displayed in a display page.

8. A computer-implemented method for refining search results using dynamically displayed categorization information, comprising:
under control of one or more computer systems configured with executable instructions,
receiving a search request including a search query;
determining an ordered set of data entries and an ordered set of preferred search categories, the ordered set of data entries being selected from a data store based at least in part on the search query, the ordered set of preferred search categories being selected based at least in part upon search category preference information for at least a portion of the data entries in the ordered set of data entries, the search category preference information for each of the ordered set of data entries specifying at least one search category as a preferred search category for the data entry; and
providing the ordered set of data entries, at least one preferred search category for each of the ordered set of data entries, and at least one preferred search category of the ordered set of preferred search categories in response to the received search request,
wherein the ordered set of data entries and the at least one preferred search category of the ordered set of preferred search categories is provided for display to a user corresponding to the received search request, and
wherein a subset of the ordered set of data entries is displayable in response to a selection of at least one of the displayed at least one preferred search category without a subsequent search request, the subset being determined based at least in part upon the selection and the at least one preferred search category provided for each of the ordered set of data entries; and
wherein, when a subset of the ordered set of data entries cannot be displayed without submitting a subsequent search request, based at least in part upon the preferred search category information for each of the ordered set of data entries,
receiving a selection of at least one of the displayed preferred search categories; and in response to the received selection, provide for display a second ordered set of data entries and at least one of a second ordered set of preferred search categories, the second ordered set of data entries being selected from the data store based at least in part on the received search query and the selected at least one preferred search category,
wherein the second ordered set of data entries is capable of including at least one data entry not included in the ordered set of data entries.

9. The computer-implemented method of claim 8, wherein a second ordered set of preferred search categories is displayed with the subset of the ordered set of data entries based at least in part upon the selection and the at least one preferred search category provided for each of the ordered set of data entries, without receiving a subsequent search request.

10. The computer-implemented method of claim 8, wherein each preferred search category further includes a set of category values.

11. The computer-implemented method of claim 10, wherein at least a portion of the set of category values for each displayed preferred search categories is provided for display and ranked based at least in part upon search category preference information for at least a portion of the data entries in the first ordered set of data entries.

12. The computer-implemented method of claim 8, further comprising:
applying search category selection rules to identifying and ordering the preferred search categories.

13. The computer-implemented method of claim 12, wherein the identifying and ordering of the preferred search categories according to the search category selection rules is based at least in part upon a total number of the data entries sharing corresponding search category preference information.

14. A computer-implemented method for refining search results using dynamically displayed categorization information, comprising:
under control of one or more computer systems configured with executable instructions,
in response to a submitted search query, receiving an ordered set of data entries, at least one preferred search category for each of the ordered set of data entries, and at least one preferred search category of an ordered set of preferred search categories, the ordered set of data entries being selected from a data store based at least in part on the search query, the ordered set of preferred search categories being selected based at least in part upon search category preference information for at least a portion of the data entries in the ordered set of data entries, the search category preference information for each of the ordered set of data entries specifying at least one search category as a preferred search category for the data entry;
displaying the ordered set of data entries and at least one of the ordered set of preferred search categories;
receiving a selection of at least one of the displayed at least one ordered set of preferred search categories;
in response to the received selection, displaying a subset of the ordered set of data entries without submitting a subsequent search request, the subset being determined based at least in part upon the selection and the at least one preferred search category provided for each of the ordered set of data entries; and
when a subset of the ordered set of data entries cannot be displayed without submitting a subsequent search request, based at least in part upon the preferred search category information for each of the ordered set of data entries, receiving a selection of at least one of the displayed preferred search categories; and in response to the received selection, provide for display a second ordered set of data entries and at least one of a second ordered set of preferred search categories, the second ordered set of data entries being selected from the data store based at least in part on the received search query and the selected at least one preferred search category, wherein the second ordered set of data entries is capable of including at least one data entry not included in the ordered set of data entries.

15. The computer-implemented method of claim 14, further comprising:

displaying a second ordered set of preferred search categories with the subset of the ordered set of data entries based at least in part upon the selection and the at least one preferred search category provided for each of the ordered set of data entries and without a subsequent search request.

16. A system for refining search results using categorization information, comprising:

a processor; and a memory device including instructions that, when executed by the processor, cause the processor to:

receive a search request including a search query;

determine an ordered set of data entries and an ordered set of preferred search categories, the ordered set of data entries being selected from a data store based at least in part on the search query, the ordered set of preferred search categories being selected based at least in part upon search category preference information for at least a portion of the data entries in the ordered set of data entries, the search category preference information for each of the ordered set of data entries specifying at least one search category as a preferred search category for the data entry; and provide the ordered set of data entries, at least one preferred search category for each of the ordered set of data entries, and at least one preferred search category of the ordered set of preferred search categories in response to the received search request, wherein the ordered set of data entries and the at least one preferred search category of the ordered set of preferred search categories is capable of being displayed to a user corresponding to the received search request, and wherein a subset of the ordered set of data entries is capable of being displayed in response to a selection of at least one of the displayed at least one preferred search category without a subsequent search request, the subset being determined based at least in part upon the selection and the at least one preferred search category provided for each of the ordered set of data entries, and wherein, when a subset of the ordered set of data entries cannot be displayed in response to a selection of at least one of the at least one preferred search category without a subsequent search request, based at least in part upon the preferred search category information for each of the ordered set of data entries, the instructions further cause the processor to:

receive selection of at least one of the displayed preferred search categories; and in response to the received selection, provide for display a second ordered set of data entries and at least one of a second ordered set of preferred search categories, the second ordered set of data entries being selected from the data store based at least in part on the received search query and the selected at least one preferred search category, wherein the second ordered set of data entries is capable of including at least one data entry not included in the ordered set of data entries.

17. The system of claim 16, wherein the second ordered set of preferred search categories is capable of including at least one preferred search category not included in the first ordered set of preferred search categories.

18. The system of claim 16, further comprising:

applying search category selection rules to identifying and order the preferred search categories, based at least in part upon a total number of the data entries sharing corresponding search category preference information.

19. A computer-readable storage medium storing instructions for refining search results using categorization information, the instructions when executed by a processor causing the processor to:

receive a search request including a search query;

determine an ordered set of data entries and an ordered set of preferred search categories, the ordered set of data entries being selected from a data store based at least in part on the search query, the ordered set of preferred search categories being selected based at least in part upon search category preference information for at least a portion of the data entries in the ordered set of data entries, the search category preference information for each of the ordered set of data entries specifying at least one search category as a preferred search category for the data entry; and provide the ordered set of data entries, at least one preferred search category for each of the ordered set of data entries, and at least one preferred search category of the ordered set of preferred search categories in response to the received search request, wherein the ordered set of data entries and the at least one preferred search category of the ordered set of preferred search categories is capable of being displayed to a user corresponding to the received search request, and wherein a subset of the ordered set of data entries is capable of being displayed in response to a selection of at least one of the displayed at least one preferred search category without a subsequent search request, the subset being determined based at least in part upon the selection and the at least one preferred search category provided for each of the ordered set of data entries, wherein, when a subset of the ordered set of data entries cannot be displayed in response to a selection of at least one of the at least one preferred search category without a subsequent search request, based at least in part upon the preferred search category information for each of the ordered set of data entries, the instructions further cause the processor to:

receive selection of at least one of the displayed preferred search categories; and in response to the received selection, provide for display a second ordered set of data entries and at least one of a second ordered set of preferred search categories, the second ordered set of data entries being selected from the data store based at least in part on the received search query and the selected at least one preferred search category, wherein the second ordered set of data entries is capable of including at least one data entry not included in the ordered set of data entries.

20. The computer-readable storage medium of claim 19, wherein the second ordered set of preferred search categories is capable of including at least one preferred search category not included in the first ordered set of preferred search categories.

21. The computer-readable storage medium of claim 19, further comprising:

applying search category selection rules to identifying and order the preferred search categories, based at least in part upon a total number of the data entries sharing corresponding search category preference information.

\* \* \* \* \*